United States Patent [19]

LeGrow

[11] Patent Number: 5,227,200
[45] Date of Patent: Jul. 13, 1993

[54] SILICONE CONTAINING AUTOMOTIVE VINYL AND RUBBER PROTECTANT

[75] Inventor: Gary E. LeGrow, Midland, Mich.

[73] Assignee: Dow Corning Corporation, Midland, Mich.

[21] Appl. No.: 848,606

[22] Filed: Mar. 9, 1992

[51] Int. Cl.$^5$ .............................. B05D 7/12; B05D 7/02
[52] U.S. Cl. ..................................... 427/387; 427/389; 427/393.4; 427/393.5
[58] Field of Search ...................... 427/387, 393.4, 389, 427/393.5

[56] References Cited

U.S. PATENT DOCUMENTS

| | | | |
|---|---|---|---|
| 3,038,818 | 6/1962 | Findlay | 427/387 |
| 3,639,156 | 2/1972 | Pittman et al. | 427/387 |
| 3,975,352 | 8/1976 | Yoerger et al. | 106/2 |
| 4,390,650 | 6/1983 | Denier et al. | 427/387 |
| 4,423,095 | 12/1983 | Blizzard | 427/374.1 |
| 4,479,893 | 10/1984 | Hirota et al. | 252/542 |
| 4,624,900 | 11/1986 | Fau | 427/387 |
| 4,631,207 | 12/1986 | Price | 427/387 |
| 4,745,142 | 5/1988 | Ohwaki et al. | 252/301.24 |
| 4,786,531 | 11/1988 | Hodson | 427/387 |
| 4,931,319 | 6/1990 | Stout et al. | 427/393.4 |
| 4,960,615 | 10/1990 | Stout et al. | 427/387 |
| 5,120,581 | 6/1992 | Brunken et al. | 427/387 |

*Primary Examiner*—Michael Lusigan
*Assistant Examiner*—Diana Dudash
*Attorney, Agent, or Firm*—James L. DeCesare

[57] ABSTRACT

A silicone containing automotive vinyl, rubber and leather protectant in the form of a solvent solution, a water dilutable emulsion, or as a "neat" fluid. The silicone is an alkylaryl silicone copolymer having long chain hydrocarbon units and aromatic units. The protectant formulation exhibits greater substantivity to organic surfaces such as vinyl, rubber and leather, and possesses enhanced penetration of organic surfaces to which it is applied resulting in an improvement in protection of such surfaces against the deterioration caused by ultraviolet radiation. Treated surfaces are also rendered paintable.

7 Claims, No Drawings

SILICONE CONTAINING AUTOMOTIVE VINYL AND RUBBER PROTECTANT

BACKGROUND OF THE INVENTION

This invention relates to a protectant composition for use on vinyl and rubber surfaces of automobiles, and more particularly is directed to a protectant composition which contains certain alkylaryl polysiloxanes.

While leather is the material of choice, leatherlike materials are finding widespread use as substitutes for leather in applications where leather has been used traditionally. Synthetic leatherlike materials are less expensive substitutes for leather, and therefore in seating, upholstery, and interior trim, leatherlike materials in the form of coated fabrics are prevalent in the automotive market where lower prices provide a competitive advantage. The most important polymer used in coated fabrics is polyvinyl chloride. This relatively inexpensive polymer resists aging processes readily, resists burning, and is very durable, rendering it ideal for vehicle upholstery and interior trim.

Increased use of leatherlike materials has spawned various new products termed "protectants" for cleaning, preserving and conditioning vinyl surfaces, as well as for treating automotive surfaces made of leather and rubber. Many of these products provide a high level of gloss to such surfaces, restore the appearance of the treated surface, and protect the surface against the environmental influence of grease, dirt, water and road film. In addition to providing a water repellent film on the surface, protectants typically offer protection against the deleterious effects of ozone, ultraviolet radiation, and other environmental causes of the degradation of vinyl, leather and rubber vehicle surfaces.

In accordance with the present invention, a protectant is provided which offers the advantage of more rapid penetration of vinyl, leather, and rubber surfaces with the result that substantivity is improved. It has also been found that the protectants of the present invention provide better protection against ultraviolet radiation in comparison with leading commercial vehicle protectant formulations. Such advantages are believed to flow from the presence in the silicone molecule of long chain hydrocarbon constituents in combination with an aromatic content.

While the alkylaryl polysiloxanes used in the protectant compositions of the present invention are known in the art as exemplified by U.S. Pat. No. 4,479,893 issued Oct. 30, 1984, their use in the fashion contemplated in accordance with the present invention is believed to be new.

SUMMARY OF THE INVENTION

It is an object of the present invention to provide an improved silicone containing automotive vinyl, rubber and leather protectant in the form of a solvent solution, a water dilutable emulsion, or as a "neat" fluid, in which the silicone is an alkylaryl silicone copolymer having long chain hydrocarbon units and aromatic units.

It is another object of the present invention to provide a protectant formulation which exhibits greater substantivity to organic surfaces such as vinyl, rubber and leather.

It is a further object of the present invention to enhance the penetration of protectants with respect to organic surfaces to which they are applied resulting in an improvement in protection of such surfaces against the deterioration caused by ultraviolet radiation.

A particularly unique property of the protectant formulation of the present invention is that the formulation renders treated surfaces paintable.

These and other objects, features and advantages of the present invention will become more apparent from a consideration of the following detailed description thereof.

DETAILED DESCRIPTION OF THE INVENTION

Compositions for use in accordance with the present invention may be in the form of a solvent solution of the alkylaryl polysiloxane copolymer, an aqueous emulsion containing the copolymer, or the composition may be applied as the "neat" copolymer. The term "neat" is used to imply that the alkylaryl silicone is applied to the surface to be treated free of any other ingredient.

The solvent solution is obtained by dissolving the alkylaryl silicone in a volatile carrier such as a hydrocarbon having from about six to about sixteen carbon atoms in the molecule. The hydrocarbon may be a straight or branched chain compound such as heptane, decane, tetradecane and hexadecane. Heptane is the preferred volatile hydrocarbon solvent.

Alternatively, a methylsilicone may be employed as the solvent carrier. The methylsilicone fluid in accordance with the present invention is a methylsiloxane fluid corresponding to the average unit formula $(CH_3)_aSiO_{(4-a/2)}$ wherein a is an integer having an average value of from two to three. The methylsiloxane fluid comprises siloxane units joined by Si-O-Si bonds. Representative units are $(CH_3)_3SiO_{1/2}$, $(CH_3)_2SiO_{2/2}$, $(CH_3)SiO_{3/2}$, and $SiO_{4/2}$. These units are present in such molar amounts so that there is an average of from about two to three methyl groups per silicon atom in the methylsiloxane fluid, and the fluid has a viscosity of less than about one hundred centistokes measured at twenty-five degrees Centigrade.

Preferably, the methylsiloxane fluid contains dimethylsiloxane units and optionally trimethylsiloxane units. Of particular utility are methylsiloxane fluids having a viscosity of less than about ten centistokes such as cyclopolysiloxanes of the general formula $[(CH_3)_2SiO]_x$ and linear siloxanes of the general formula $(CH_3)_3SiO[(CH_3)_2SiO]_ySi(CH_3)_3$ in which x is an integer having a value of from three to ten and y is an integer having a value of from zero to about four.

Thus, low viscosity methylsilicone fluids contemplated in accordance with the present invention include methylsiloxane fluids representative of which are volatile cyclic silicone fluids and volatile linear silicone fluids. Specific examples of these volatile methylsiloxane fluids are polydimethylcyclosiloxane and the linear silicone fluid hexamethyldisiloxane. Such volatile fluids have viscosities generally less than about ten centistokes measured at twenty-five degrees Centigrade and most preferably have viscosities between about 0.65 to 5.0 centistokes.

The volatile cyclic silicones generally conform to the formula $(R_2SiO)_x$ in which R is an alkyl radical having from one to three carbon atoms or a phenyl group. Most typically the cyclic siloxanes have the formula $[(CH_3)_2SiO]_x$ in which x is an integer from three to ten. Some representative volatile cyclic siloxane compounds found to be especially useful in accordance with the present invention are the methylsiloxane tetramer octamethylcyclotetrasiloxane and the methylsiloxane pentamer decamethylcyclopentasiloxane. Mixtures of the tetramer and pentamer may also be employed. Such cyclic siloxanes have viscosities ranging from about 2.5 centistokes to about five centistokes. These materials are also known under The Cosmetics, Toiletries and Fragrance Association, Inc., Washington, DC, adopted name of cyclomethicone.

The volatile low viscosity linear methylsilicone fluid has the formula $R_3SiO(R_2SiO)_nSiR_3$ in which R is an alkyl radical having one to six carbon atoms and n is an integer of from two to nine. Most representative of this class of volatile linear methylsiloxane fluid is hexamethyldisiloxane of the formula

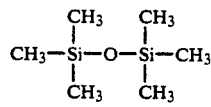

which has a viscosity of 0.65 centistokes measured at twenty-five degrees Centigrade.

Both the cyclic and linear low viscosity volatile methylsiloxane materials are clear fluids and are essentially odorless, nontoxic, nongreasy and nonstinging. These methylsiloxane fluids are nonirritating to the skin and exhibit enhanced spreadability and ease of rub-out when applied to surfaces. Once applied, the materials will evaporate leaving behind no residue.

When applied in the emulsion form, the alkylaryl polysiloxane is emulsified in water with the aid of a nonionic surfactant. Standard mixing, agitating, and milling techniques are employed in the preparation of the emulsion. The emulsifier found to be the most suitable for the purposes of the present invention is an ethoxylated trimethylnonanol nonionic surfactant sold under the trademark TERGITOL® TMN-6 by the Union Carbide Chemical & Plastics Company Industrial Chemical Division, Danbury, Conn. Chemically, this nonionic surfactant is trimethylnonylphenyl poly(ethylene oxide). The nonionic surfactant may be employed in combination with an anionic surfactant such as a sodium octylphenoxy poly(ethoxyethyl) sulfate solid under the trademark TRITON® W-30 by the Union Carbide Chemical & Plastics Company Industrial Chemical Division, Danbury, Conn. Such emulsions are commercially available as water dilutable silicone emulsions containing fifty percent silicone fluid in water. For use in the present invention, the commercial emulsion is diluted with water to a content of about twenty percent silicone fluid and eighty percent water.

In the present invention, the method of providing a protective finish to a vinyl, rubber or leather substrate involves applying to the substrate a protectant composition which includes an alkylaryl polysiloxane copolymer having the formula

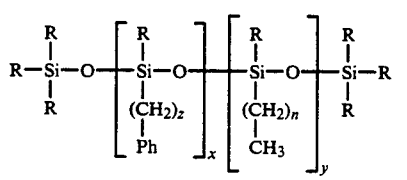

(I)

in which x and y are integers each of which is equal to at least one, the sum of x and y is from twenty to about one hundred, z has a value of zero to four, n is an integer having a value of five to about thirty, Ph is phenyl, and R is an alkyl group having from one to six carbon atoms.

Preferably, the alkylaryl polysiloxane copolymer has a ratio of x:y of 1:4 and the sum of x and y is 30-70. Most preferably, R in the above formula is methyl, n is eleven, z is three, and the sum of x and y is fifty. A methyldodecyl-methyl(2-phenylpropyl) siloxane having a viscosity of about twelve hundred centistokes measured at twenty-five degrees Centigrade (77 F.) is the most suitable.

These alkylaryl polysiloxane copolymers are known in the art and are commercially available. They are typically prepared in accordance with standard techniques for the production of dimethylsiloxane materials. Preferred methods involve the hydrosilylation of an hydrogenmethylsiloxane with an alpha olefin and an alkenylbenzene in the presence of a platinum catalyst such as chloroplatinic acid.

It is known that polydimethylsiloxane fluids can be employed as an ingredient in formulations for application to surfaces such as vinyl, rubber and leather for the purpose of providing a protective coating. Some of these known commercial formulations are even capable of rendering the treated surface antistatic for the repulsion of dust and dirt. However, when these formulations are applied as a protective coating for outdoor surfaces, such as on the rubber sidewall of a motor vehicle tire or the vinyl cover of an exposed spare tire, the polydimethylsiloxane coating can be rapidly removed from the exposed surface by contact with water which is encountered while driving in rain or snow. In order to restore the appearance of such surfaces, repeated applications of the commercial formulation are required which is a disadvantage as well as a time consuming task.

In contrast, the alkylaryl polysiloxane containing compositions of the present invention have been found to provide a more durable and substantive protective finish to treated surfaces without requiring frequent reapplications. The finish possesses a superior gloss, luster, shine and repellent characteristics, and soiled surfaces may be easily rinsed clean. Thus, a surface to which the coating of the present invention has been applied can be washed free of road salt revealing a clean appearing surface of high gloss. Surfaces treated with known commercial polydimethylsiloxane containing compositions are depleted by repeated outdoor exposure and when rinsed reveal heavily soiling.

The improvements provided by the finish of the present invention can be attributed to the presence in the molecule of the alkylaryl silicone of the combination of long chain hydrocarbon content and aromatic content. This combination provides a protectant that has greater substantivity and true ultraviolet protection in comparison to commercial formulations containing polydimethylsiloxane fluids. Hence, the compositions of the present invention possess a more pronounced attraction to and a greater affinity for organic surfaces such as rubber and vinyl, than is possessed by current commercial polydimethylsiloxane containing compositions. This is of particular significance in outdoor applications where the treated surface is exposed to varied weathering conditions.

The following examples are set forth for the purpose of further illustrating the concepts of the present invention.

EXAMPLE I

A commercially available water dilutable silicone emulsion containing fifty percent alkylaryl silicone fluid in water was diluted with water to a content of about twenty percent silicone fluid and eighty percent water. The silicone fluid was an alkylaryl polysiloxane conforming to formula (I) shown above wherein R is methyl, n is eleven, z is three, and the sum of x and y is about fifty. This methyldodecyl-methyl(2-phenylpropyl) siloxane had a viscosity of about twelve hundred centistokes measured at twenty-five degrees Centigrade. The diluted emulsion was poured into a spray applicator and spray applied to several test substrates of rubber and vinyl. The test substrates were evaluated in comparison to control substrates which had been treated with a leading commercially available rubber and vinyl protectant. The control protectant was in the form of a twenty-five percent solids containing aqueous emulsion of polydimethylsiloxane fluid. The polydimethylsiloxane fluid had a viscosity believed to be in the range of about 300–400 centistokes. Evaluations of the treated surfaces following outdoor exposure revealed that the surfaces treated with the composition of the present invention produced a continuous higher gloss shinier appearance and would repel water better than the surfaces treated with the commercial formulation. Surfaces treated in accordance with the present invention were easily flushed clean with water to reveal a shiny finish whereas surfaces treated with the commercial formulation revealed soiling.

EXAMPLE II

Example I was repeated except that the alkylaryl polysiloxane fluid was prepared in the form of a solvent solution in heptane in a volume:volume ratio of 50:50 percent. This solution was spray applied to several rubber tires. A second spray applicator was prepared containing the alkylaryl polysiloxane fluid in "neat" form. The "neat" alkylaryl polysiloxane was applied to several rubber tires. Evaluations were the same as indicated in Example I. In addition, it was noted that both the solvent solution and the "neat" silicone wet and penetrated the rubber tires easily. The solvent solution possessed a more rapid rate of penetration than the "neat" fluid. Both the solvent solution and the "neat" silicone penetrated the rubber tires more rapidly than the commercial protectant however.

It will be apparent from the foregoing that many other variations and modifications may be made in the compounds, compositions, structures, and methods described herein without departing substantially from the essential features and concepts of the present invention. Accordingly, it should be clearly understood that the forms of the invention described herein are exemplary only and are not intended as limitations on the scope of the present invention as defined in the appended claims.

That which is claimed is:

1. A method of providing a protective finish to a vinyl, rubber or leather substrate comprising applying to the substrate a protectant composition which includes an alkylaryl polysiloxane copolymer having the formula

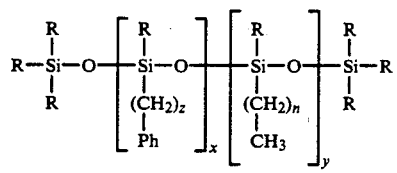

in which x and y are integers each of which is equal to at least one, the sum of x and y is from twenty to about one hundred, z has a value of zero to four, n is an integer having a value of five to about thirty, Ph is phenyl, and R is an alkyl group having from one to six carbon atoms.

2. A method according to claim 1 in which the ratio of x:y is 1:4.

3. A method according to claim 1 in which the sum of x and y is 30–70.

4. A method according to claim 1 in which R is methyl, n is eleven, z is three, and the sum of x and y is fifty.

5. A method according to claim 1 in which the composition is in the form of a solvent solution of the polysiloxane copolymer, the solvent being a volatile carrier selected from the group consisting of (i) methylsiloxane fluids having a viscosity of less than about ten centistokes including cyclopolysiloxanes of the formula $[(CH_3)_2SiO]_x$ and linear siloxanes of the formula $(CH_3)_3SiO[(CH_3)_2SiO]_ySi(CH_3)_3$ in which x is an integer having a value of from three to ten and y is an integer having a value of from zero to about four, and (ii) hydrocarbons having from six to sixteen carbon atoms in the molecule including straight and branched chains.

6. A method according to claim 1 in which the composition is in the form of an aqueous emulsion of the polysiloxane copolymer.

7. A method according to claim 1 in which the composition consists of the polysiloxane copolymer in neat form.

* * * * *